United States Patent [19]

Landherr

[11] Patent Number: 5,746,158
[45] Date of Patent: May 5, 1998

[54] HUNTING DOG SIGNAL DEVICE

[76] Inventor: Nicholas N. Landherr, 927 East Vine, Owatonna, Minn. 55060

[21] Appl. No.: 835,317

[22] Filed: Apr. 7, 1997

[51] Int. Cl.[6] ................................................. A01K 29/00
[52] U.S. Cl. ................................................. 119/858
[58] Field of Search ........................... 119/758, 760, 119/856, 858

[56] References Cited

U.S. PATENT DOCUMENTS

| | | | |
|---|---|---|---|
| 2,601,088 | 6/1952 | Burgess. | |
| 2,652,649 | 9/1953 | Kobert. | |
| 3,872,529 | 3/1975 | Wainwright. | |
| 5,199,383 | 4/1993 | Lagana | 40/303 X |
| 5,546,970 | 8/1996 | Amato | 135/16 |

FOREIGN PATENT DOCUMENTS

| | | | |
|---|---|---|---|
| 842555 | 6/1939 | France | 119/858 |
| 50796 | 3/1941 | France | 119/858 |

Primary Examiner—Robert P. Swiatek
Attorney, Agent, or Firm—Burd, Bartz & Gutenkauf

[57] ABSTRACT

A visual indicia signal device to be worn by hunting dog in order that a hunter can maintain visual contact with the dog while engaging in hunting activity. The device also enables other hunters to identify the dog as such and not mistake it for a game animal. The device includes a harness worn on the dog, having at lease one strap that is located on the side of the dog. A holster assembly includes a base attached to the harness and located on the side of the dog. The base carries a mounting fixture that connects to the end of the mast. The mounting fixture has a bayonet-type zig-zag mounting slot. The mast has a pin at the end that fits into the bayonet type mounting slot of the mounting fixture and rides down the zig-zag slot track to the bottom where it engages in upwardly directed notch. Bias means in the bottom of the fixture bias the pin in engagement in the notch to releasable hold the mast on the harness of the hunting dog.

14 Claims, 3 Drawing Sheets

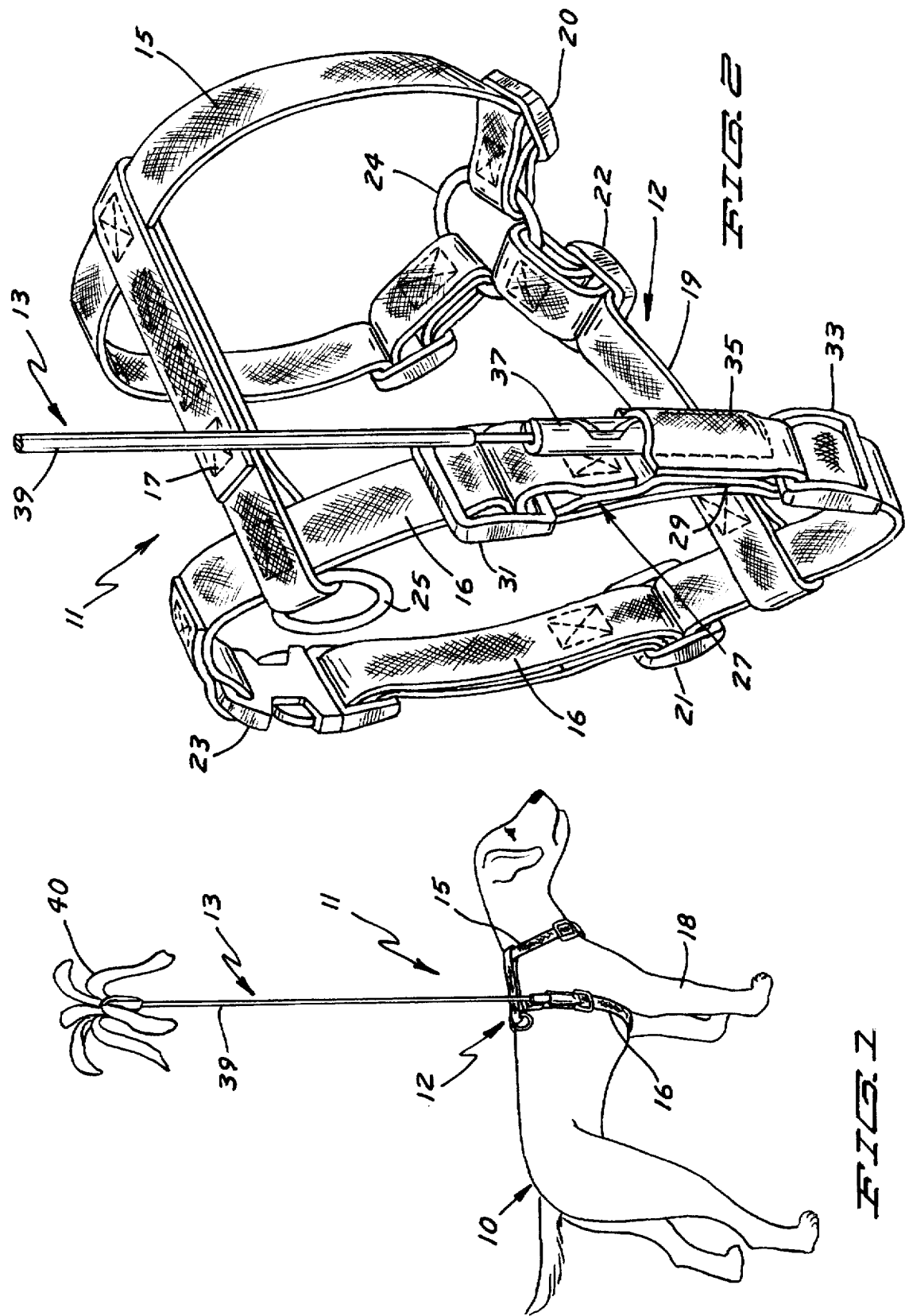

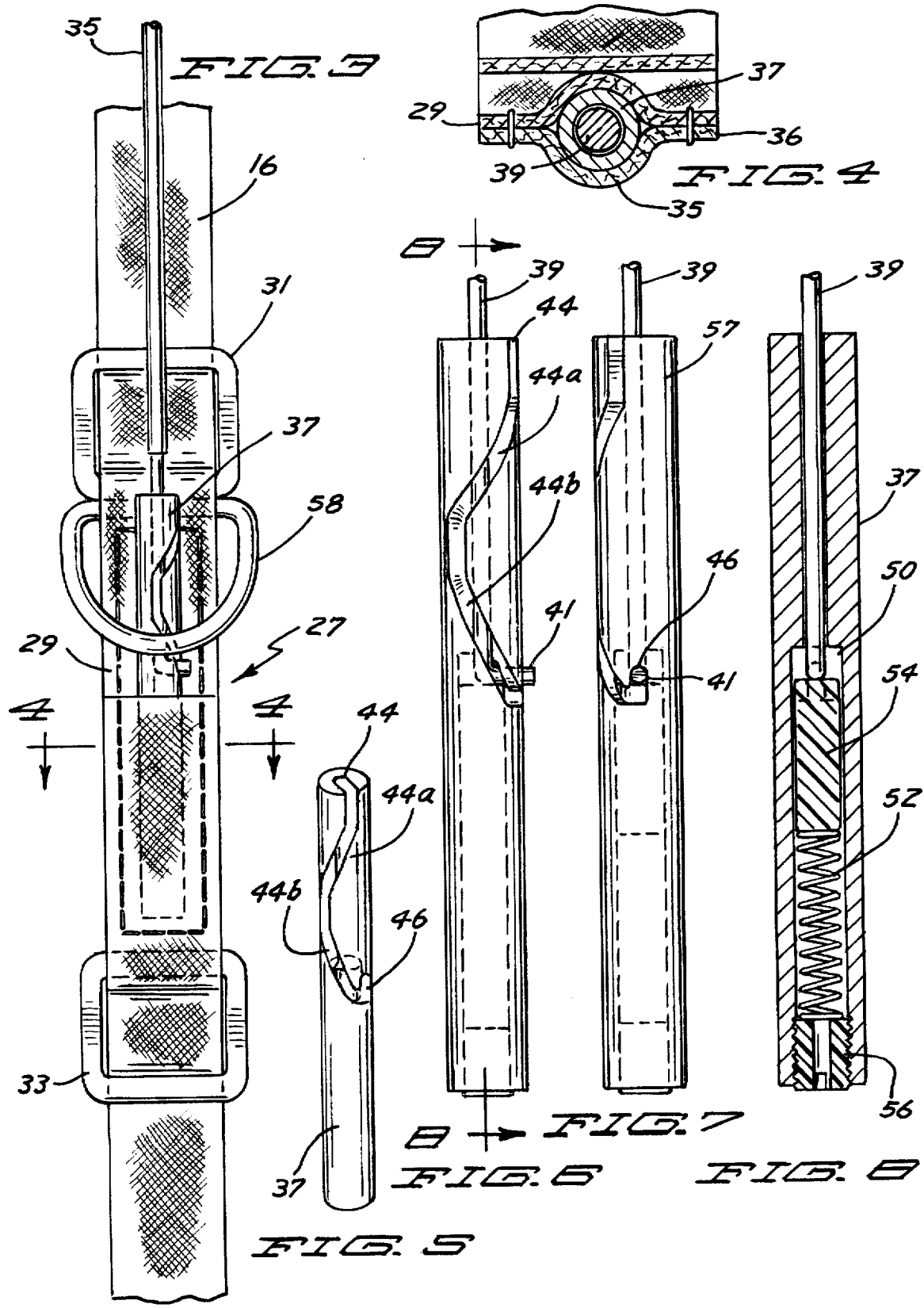

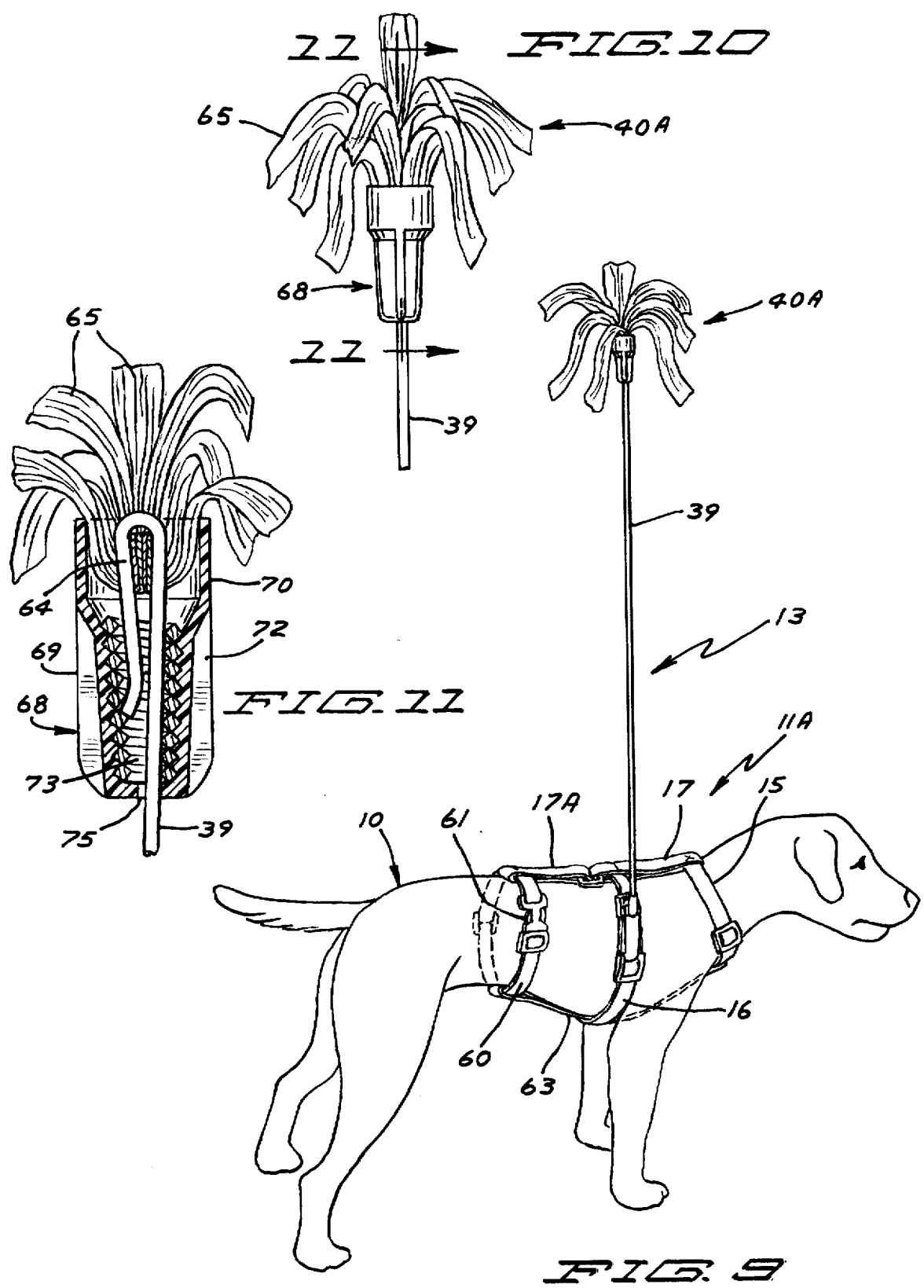

HUNTING DOG SIGNAL DEVICE

BACKGROUND OF THE INVENTION

When hunting with a hunting dog, it is important for the hunter to maintain visual contact with the dog to know the location of the dog at all times. The dog follows an erratic course through high grass, under brush, hilly terrain and the like, all impeding the efforts of the hunter to maintain visual contact. It is also important to know where the dog is when the dog freezes upon spotting intended game. It is advisable for hunters to be able to identify the hunting dog as such and not mistake it for game.

In order to address this problem, certain visual signal devices have been devised whereby the dog carries a signaling indicia such as a flag. Such devices are shown, for example, in U.S. Pat. No. 5,119,383 issued Apr. 6, 1993 to Lagna; and U.S. Pat. No. 2,652,649 issued Sep. 22, 1953 to Kolbert. Both of these devices include a harness that is attached to the dog, and a flag assembly which extends from the harness centrally from the back of the dog.

It is desirable to have such a device that includes a flag assembly with a mast readily detachable from the harness, and positioned on the dog so as to provide minimal impediment to movement to the dog. It is also desirable to have such a device which will easily deflect upon encountering an obstacle. The device should be easily seen by the hunters to know the location of the dog and to distinguish one dog from another or from game.

SUMMARY OF THE INVENTION

The invention pertains to a visual signal device to be carried by a hunting dog. The purpose of the device is to enable visual contact with the hunting dog. The device also serves to alert hunters that the dog is not a game animal. The device includes a harness that is fitted to the dog in the usual fashion and that has at least one strap that is positioned on the side of the dog. The signal device includes a flag assembly with a mast having a distal upper end and a proximal lower end. A flag or other suitable visual indicia is fixed to the distal end of the mast. Preferably it is readily replaceable as when worn out or damaged.

The signal device includes a mounting assembly with a bayonet type mounting fixture to releasably mount the flag mast to the harness at a location on the side of the dog. A holster assembly includes a base comprised as an elongate section of strap with slidable buckles at either end that engage a harness strap on the side of the dog and permit positional adjustment. The base carries an upwardly open pocket. The bayonet mounting fixture is located in the pocket. The bayonet fixture is an elongate cylindrical member with a lower end located in the pocket and fixed therein by suitable means so as not to be easily disengaged. A zig-zag slot extends axially through the cylindrical member from the upper end thereof to an intermediate position. The slot extends radially outward from the center of the fixture to a location on the circumference. The slot has a first leg that extends downwardly along the fixture in a longitudinal fashion at an angular relationship to the longitudinal axis of the fixture. A second leg extends downwardly from the first leg in angularly opposite direction. At the bottom of the slot is an upwardly directed notch. A spring loaded plunger is located in the fixture at a location beneath the upwardly directed notch. The spring loaded plunger can be located in an axial opening extending downward from the slot.

The proximal end of the mast has a horizontal pin. The pin can be comprised as a right angle turned section of the lower end of the mast. The slot in the fixture has a transverse dimension just larger than the diameter of the pin to permit sliding engagement by the pin. The pin fits in the slot at the top of the fixture and rides down the slot to the bottom thereof, traversing both angular legs of the slot. The pin is pushed against the bias of the plunger and moved to a location where it is positioned beneath the notch. The plunger pushes the pin up into the notch where it is releasably retained in bayonet-fixture type fashion, holding lower end of the mast in an upright orientation.

IN THE DRAWINGS

FIG. 1 is side elevational view of a signal device according to the invention mounted on a hunting dog;

FIG. 2 is a perspective view of the signal device of FIG. 1 removed from the hunting dog and with the mast foreshortened for purposes of illustration;

FIG. 3 is an enlarged side view of the mast mounting assembly of the signal device of FIG. 2;

FIG. 4 is an enlarged sectional view of a portion of the mast mounting assembly of FIG. 3 taken along the line 4—4 thereof;

FIG. 5 is a perspective view of the mounting fixture of the signal device of the invention;

FIG. 6 is an enlarged side view of the bayonet mounting fixture of the device showing the end of the mast assembled therein;

FIG. 7 is a side view of the bayonet fixture of FIG. 6 taken from the right side thereof;

FIG. 8 is a sectional view of the bayonet mounting fixture of FIG. 6 taken along the line 8—8 thereof;

FIG. 9 is a side elevational view like that of FIG. 1 showing a modification of the signal device;

FIG. 10 is an enlarged view of the distal end of the mast and flag assembly of the signal device; and FIG. 11 is an enlarged sectional view of a portion of the flag assembly of FIG. 10 taken along the line 11—11 thereof.

DESCRIPTION OF PREFERRED EMBODIMENTS

Referring to the drawings, there is shown in FIG. 1 a dog 10 wearing a signal device according to the invention indicated generally at 11. The signal device 11 includes a harness 12 that is installed on the dog 10. A flag assembly 13 is connected to the harness. Signal device 11 enables a hunter to maintain visual contact with the dog 10 as the dog roams freely about the hunting area, through the bush, over hills, across fields and the like.

More particularly shown in FIG. 2, the harness 12 can be of a conventional dog harness variety. It includes a neck collar 15 intended to be fitted around the neck of the dog 10 forward of the forelegs 18. A chest loop or chest collar 16 is fitted around the chest of the dog aft of the forelegs 18. A back strap 17 connects the upper portions of the neck collar 15 and the chest collar 16 and extends along the back of the dog. A breast strap 19 connects the lower portions of the neck collar 15 and the chest collar 16. The breast strap 19 extends along the breast of the dog and between the forelegs 18.

The harness 12 includes adjustment buckles for adjustment of the length of the various straps and collars in order to accommodate dogs of different sizes. Adjustment buckles 20 are located on the neck collar 15. An adjustment buckle 21 is located on the chest collar 16. A releasable buckle 23 also is located on the chest collar 16 and opens and closes ends of the chest collar 16 for installing the harness on the dog 10. Another adjustable buckle 22 is provided to adjust the length of the breast strap 19. A ring 24 connects the forward end of the breast strap 19 to the next strap 15. A leash loop 25 is provided at the aft end of the back strap 17.

As can be seen the harness 12 includes at least one strap section located on the side of the dog and in a generally vertical orientation. A holster assembly 27 is fastened to the harness 12 on one such strap section thereof located on the side of the dog. Holster assembly 27 includes a strap-like base 29 comprised as a segment of strap with loops at either end. The loop at one end of base 29 connects to a first slide buckle 31. The loop at the other end of base 29 connects to a second slide buckle 33. Each slide buckle 31, 33 is of the type that has a closed loop with an intermediate cross piece. A side strap section of the chest collar 16 is trained through each slide buckle 31, 33, passing over the cross piece of each. Base 29 is slidably adjustable on the side strap of chest collar 16 of harness 12.

Holster assembly 27 has a pocket 35. Pocket 35 is formed on the base 29 by a pocket patch piece 36 that is positioned on the base 29 and sewn edgewise along sides and the bottom thereof. A bayonet mounting fixture 37 is located in the pocket 35.

Flag assembly 13 includes a mast 39 having a distal top end and a proximal bottom end. A multi-pendant flag 40 is attached at the distal end of the mast 39, preferably in releasable and replaceable fashion, as it is apt to be frequently damaged or disengaged upon encountering brush, low tree branches and the like. A pin 41 is fixed to the proximal end of the mast 39. Pin 41 is perpendicular to the axis of the mast 39. The pin 41 is preferably formed as the end of the mast 39 turned at a right angle.

The fixture 37 is secured in the pocket 35 in good fashion so as not to be readily disengaged. For example, the fixture 37 can be glued therein. The lower end of the mast 39 is releasable engaged in the bayonet fixture 37. This is accomplished by a bayonet slot type mounting arrangement. A retainer loop 58 limits outward movement of fixture 37.

As shown in FIG. 5, bayonet mounting fixture 37 is a generally cylindrical member. A slot 44 is formed in fixture 37. It extends from the top of the fixture axially downward to an intermediate location on the fixture 37. The slot 44 extends radially from the center of the fixture 37, opening at the circumference thereof. The slot 44 extends generally downwardly from the upper end of the fixture 37 and describes a generally V-shaped or zig-zag track. The slot 44 has a first leg 44a that extends angularly along the perimeter of the fixture 37 at a first angle relative to the axis thereof. A second leg 44b extends back along the perimeter of the fixture 37 in symmetrical relationship to the first leg 44a at an opposite angle. The lower end of the slot 44 is provided with a upwardly extending notch 46. The notch 46 and the slot 44 are of a width just larger than the diameter of the mast 39 such that the pin 41 just fits therein. The pin 41 is inserted in the upper end of the slot 44. The pin 41 rides in the slot 44 and follows the track of the slot 44 as it is moved downwardly. The pin rides down the upper leg 44a of the track of the slot 44 then reverses direction and rides down the lower leg 44b of the slot 44. When the pin reaches the bottom, it is biased upward into seating and locking engagement in the notch 46.

A plunger assembly is located in the fixture 37 in order to bias the pin 41 of mast 39 in locked engagement with the notch 46. As shown in FIG. 8, a plunger chamber 50 is constituted as an axial bore in the fixture 37 extending from the lower end thereof. Plunger chamber 50 intersects the slot 44. The plunger assembly includes a helical compression spring 52 and a plunger head 54 located above the helical compression spring 52. An end cap or plug 56 threaded into the lower end of the plunger chamber 50 closes it and retains the lower end of the spring.

The plunger chamber 50 has a larger transverse dimension than the slot 44. The plunger head 54 rides in the plunger chamber 50 on top of the compression spring 52 with the compression spring 52 bearing against the end plug 56 and in compression. The plunger head 54 is stopped at the intersection of the chamber 50 and the slot 44.

The plunger chamber 50 extends internally of the fixture 37 to a point above the bottom of notch 44. When positioned therein, the spring 52 is in compression. Upon insertion of the lower end mast 39 in such a fashion that the pin 41 rides down the slot 44, the pin 41 engages and presses the plunger head 54 downwardly against the force of compression spring 52. The mast 39 is rotated to a point where the pin 41 is poised beneath the notch 46. There the mast 39 can be released whereby the plunger head 54 pushes the pin 41 up into the notch 46, locking it therein.

The mast 47 is made of a very flexible material such as a flexible stainless steel. This permits a high degree of flexure of the mast as the dog traverses the rough terrain. In addition, the mounting arrangement of the holster assembly 27 on the harness 12 permits angular movement of the fixture 37 in response to movement of the mast 39. This is facilitated by the location of the holster assembly on the side of the dog. This increases the flexibility of the assembly.

Referring to FIG. 9, there is shown a modification of a signal device of the invention indicated at 11A installed on the dog 10. The physique of certain dogs may lead to irritation to the dog in the vicinity behind the fore-legs as a result of rubbing by the chest collar 16. The modification of FIG. 9 alleviates this condition. A hip collar 60 is added to the device and is situated behind the rib cage of the dog. A releasable buckle assemble 61 permits installation and removal. A belly strap 63 connects the lower portion of the chest collar 16 to the lower portion of the hip collar 60. An adjustable extension 17A of the back strap 17 connects the upper part of the chest collar 16 to the upper extremity of the hip collar 60. The hip collar 60 lends positional support to the chest collar 16. This keeps it from irritating the dog in the region aft of the fore-legs. It serves also to assist in maintaing the mast in an upright orientation.

The signal device 11A of FIG. 9 has a flag assembly 13 including a mast 39 carrying a flag 40A. The flag 40A is releasable and replacably carried by the tip of the mast 39. As shown in FIG. 11, the distal tip of mast 39 is formed into a loop 64. The flag 40A is formed from a plurality of individual flag segelments or ribbons 65. The ribbons may all be the same color or they may be of various colors. Each ribbon 65 is elongate and is trained through the loop 64 at the distal end of mast 39.

The ribbons 65 are releasably held to the end of mast 39 by a twist type connector 68. Connector 68 is formed like the type of connector that is used to connect the bare ends of electrical wires. The connector has a tubular body 69 with an upwardly open cup 70 and a neck 72. The neck 72 has a throat carrying interior threads 73. The body 69 has a bottom opening 75. Mast 39 extends through the bottom opening 75.

The connector 68 covers the loop 64 such that the ends of the ribbons engaging the loop are lodged in the cup 70 and forcefully retained therein. Connector 68 is fastened thereon by a twisting motion relative to the end of mast 39. This results in bunching and retention of the ribbon ends in cup 70. Twisting in an opposite direction moves the connector downwardly along mast 39 and dislodges the ribbon ends for removal and replacement.

The embodiments of the invention in which an exclusive property or privileg is claimed, are defined as follows:

1. A signal device to be worn by a hunting dog, comprising;

a dog harness fitted to a hunting dog;

said harness having a strap section disposed on the side of the dog;

a holster assembly;

means attaching the holster assembly to the harness strap section disposed on the side of the dog;

said holster assembly having an upwardly open pocket;

a generally cylindrical mounting fixture located in the pocket with an upper end and a lower end, and a generally upright axis;

a slot in the mounting fixture extending from the top thereof to an intermediate location toward the bottom of the fixture;

said slot describing a generally zig-zag path on the circumference of the fixture, having a first leg extending from the top of the fixture downwardly at a first angle with respect to the axis of the fixture, and a second leg extending from the lower end of the first leg at an opposite angle relative to the axis of the fixture;

an upwardly extended notch at the bottom of the slot;

a mast assembly including a mast with a proximal end and distal end;

visual signal indicia connected at the distal end of the mast;

a mounting pin at the proximal end of the mast disposed at an angle relative to the mast;

said proximate end of the mast and the pin being of a size to engage the slot with the pin riding in the track of the slot traversing the length of the slot to the notch, and engageable in the notch; and biasing means to bias the pin in engagement with the notch.

2. The signal device of claim 1 wherein:

said holster assembly includes a base comprised as a strap segment with closed loop buckles at either end in adjustable engagement with the harness strap section.

3. The signal device of claim 2 including:

a spring biased plunger assembly assembled to the lower end of the fixture, having a plunger head that biases the pin in engagement with the notch.

4. The signal device of claim 3 wherein:

said plunger assembly includes an axial bore formed in the lower end of the fixture and extending upwardly to a location of intersecting relationship with the slot, a compression spring in the bore, said plunger head engaged by an upper end of the spring to bias the plunger head against the pin, and means closing the end of the bore and engaging the other end of the compression spring.

5. The signal device of claim 4 wherein:

said visual signal indicia comprises a replaceable flag.

6. The signal device of claim 5 wherein:

said means closing the lower end of the fixture includes a threaded plug.

7. The signal device of claim 6 wherein:

said pocket is formed by a pocket patch fixed to the base by sewing.

8. The signal device of claim 7 wherein:

said base has loops at either end engaging the buckles.

9. The signal device of claim 8 wherein:

said mast is comprised as an elongate stainless steel member.

10. The signal device of claim 1 including:

a spring biased plunger assembly assembled to the lower end of the fixture, having a plunger head that biases the pin in engagement with the notch.

11. The signal Device of claim 10 wherein:

said plunger assembly includes an axial bore formed in the lower end of the fixture and extending upwardly to a location of intersecting relationship with the slot, a compression spring in the bore, said plunger head engaged by an upper end of the spring to bias the plunger head against the pin, and means closing the end of the bore and engaging the other end of the compression spring.

12. The signal device of claim 11 wherein:

said visual signal indicia comprises a replaceable flag.

13. The signal device of claim 1 wherein:

said visual signal indicia comprises a replacable-flag formed of a plurality of ribbons;

a loop located at the distal end of the mast;

said ribbons in engagement with the loop;

a connector assembled to the mast and movable to a position of covering relationship to the distal end of the mast, said connector having a body with an interior cavity having interior screw threads positioned so that the connector can be twisted on the end of the mast in such a fashion to lodge the ribbons on the end of the mast, and twisted in the opposite direction to permit removal of the ribbons.

14. The signal device of claim 13 wherein:

said mast is comprised as a stainless steel member.

* * * * *